(12) United States Patent
Miyachi

(10) Patent No.: US 8,851,761 B2
(45) Date of Patent: Oct. 7, 2014

(54) SPLIT CAGE FOR ROLLING BEARING AND ROLLING BEARING USING THE SPLIT CAGE

(71) Applicant: JTEKT Corporation, Osaka (JP)

(72) Inventor: Takeshi Miyachi, Yao (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 13/897,802

(22) Filed: May 20, 2013

(65) Prior Publication Data

US 2013/0315522 A1 Nov. 28, 2013

(51) Int. Cl.
F16C 33/46 (2006.01)
F16C 33/56 (2006.01)
F16C 33/51 (2006.01)
F16C 19/36 (2006.01)

(52) U.S. Cl.
CPC ............... F16C 33/56 (2013.01); F16C 33/513 (2013.01); F16C 2360/31 (2013.01); F16C 33/4635 (2013.01); F16C 19/364 (2013.01); F16C 2300/14 (2013.01)
USPC ............................ 384/580; 384/576; 384/623

(58) Field of Classification Search
USPC ................. 384/523, 527, 536, 530, 572, 576, 384/577–578, 580, 623
See application file for complete search history.

(56) References Cited

U.S. PATENT DOCUMENTS

| 1,125,316 | A |  | 1/1915 | Heinzelman |  |
| 4,239,304 | A | * | 12/1980 | Wakunami | 384/573 |
| 6,206,575 | B1 | * | 3/2001 | Matsushita et al. | 384/523 |
| 6,835,000 | B2 | * | 12/2004 | Hiramatsu et al. | 384/523 |
| 6,843,604 | B2 | * | 1/2005 | Hiramatsu | 384/523 |
| 6,857,785 | B2 | * | 2/2005 | Takahashi et al. | 384/572 |
| 7,828,485 | B2 | * | 11/2010 | Waseda et al. | 384/570 |
| 8,177,437 | B2 | * | 5/2012 | Omoto | 384/572 |
| 2009/0208161 | A1 | * | 8/2009 | Jauernig et al. | 384/572 |
| 2010/0215298 | A1 | * | 8/2010 | Zeidlhack | 384/51 |

FOREIGN PATENT DOCUMENTS

| DE | 35 12 202 A1 | 10/1986 |
| DE | 10 2011 005 407 A1 | 9/2012 |
| EP | 1 408 248 A2 | 4/2004 |
| EP | 2 264 325 A1 | 12/2010 |
| JP | A-2007-224953 | 9/2007 |
| JP | A-2007-285507 | 11/2007 |
| JP | A-2011-106605 | 6/2011 |
| JP | 2012047199 A * | 3/2012 |
| JP | 2012225492 A * | 11/2012 |
| WO | WO 2007072637 A1 * | 6/2007 |

OTHER PUBLICATIONS

Extended European Search Report issued in European Application No. 13167839.3 dated Oct. 10, 2013.

* cited by examiner

Primary Examiner — Marcus Charles
(74) Attorney, Agent, or Firm — Oliff PLC

(57) ABSTRACT

In a split cage for a rolling bearing, cage segments each having a plurality of pockets that accommodate rolling elements are arranged in a circular manner along the circumferential direction. Protrusions are formed on end faces of rims of one of the adjacent cage segments, and grooves are formed in end faces of rims of the other one of the adjacent cage segments. By fitting the protrusions into the grooves, the adjacent cage segments are prevented from moving relative to each other in the radial direction.

3 Claims, 7 Drawing Sheets

CONVENTIONAL ART

SPLIT CAGE FOR ROLLING BEARING AND ROLLING BEARING USING THE SPLIT CAGE

INCORPORATION BY REFERENCE

The disclosure of Japanese Patent Application No. 2012-116524 filed on May 22, 2012 including the specification, drawings and abstract, is incorporated herein by reference in its entirety.

BACKGROUND OF THE INVENTION

1. Field of the Invention

The invention relates to a split cage for a rolling bearing, in which a plurality of cage segments is arranged in a circular manner, and relates also to a rolling bearing using the split cage.

2. Description of Related Art

Conventionally, in a horizontal axis propeller-driven wind power generator, a rolling bearing is used so that a main shaft to which blades are attached is rotatably supported. In recent years, wind power generators have become larger, and accordingly the diameter of a main shaft of a wind power generator may be several meters or more. Accordingly, rolling bearings have become larger in order to support such a large-sized main shaft. As a cage for a large-sized rolling bearing, a cage made of a synthetic resin may be used. The synthetic resin cage has the advantages, over a metal cage assembled by welding, that the synthetic resin cage is light and sufficient accuracy of the synthetic resin cage is easily achieved. However, it is difficult to form the synthetic resin cage with a large diameter, as a single-piece member, by injection molding. Therefore, a split cage that is formed of a plurality of pieces arranged in the circumferential direction is used (see, for example, EP Patent No. 2264325 (A1)). The split cage has a plurality of cage segments arranged in a circular manner.

FIG. 8 is a perspective view of main portions of an example of a conventional cage segment. The cage segment 100 has a pair of first and second rims 101, 102, and a plurality of cage bars 103. The first rim 101 and the second rim 102 face each other while being separated from each other by a predetermined distance. The cage bars 103 extend from the first rim 101 to the second rim 102. In the cage segment 100, pockets 104 that accommodate tapered rollers (not shown), which serve as rolling elements, are formed of spaces each of which is defined by the two cage bars 103 adjacent to each other, the first rim 101, and the second rim 102. The cage segment 100 is made of a synthetic resin and formed by injection molding.

An outer guide portion 114 is formed on the outer periphery of each of the cage bars 103 so as to project from the outer periphery. The outer guide portions 114 are in sliding contact with an outer ring raceway surface of a rolling bearing to guide the rotation of the cage segment 100. A pair of inner guide portions 115 is formed on the inner periphery of each of the cage bars 103 so as to project from the inner periphery. The inner guide portions 115 in each pair are apart from each other in the axial direction. The inner guide portions 115 are in sliding contact with an inner ring raceway surface of the rolling bearing to guide the rotation of the cage segment 100. Among the inner guide portions 115, the inner guide portions 115 on the second rim 102 side also serve as holding portions that hold the tapered rollers from the radially inner side.

In the conventional split cage, one of the cage segments 100 adjacent to each other may be pressed in the circumferential direction by the other one of the adjacent cage segments 100, for example, if the rolling speed of the tapered rollers 113 in the one of the adjacent cage segments 100 falls below that of the tapered rollers 113 in the other one of the adjacent cage segments 100, or if thermal expansion of each of the cage segments 100 occurs. In this case, because end faces of the rims 101, 102 of the one of the adjacent cage segments 100 and end faces of the rims 101, 102 of the other one of the adjacent cage segments 100 press each other, radial sliding may occur between the end faces of the one of the adjacent cage segments 100 and the end faces of the other one of the adjacent cage segments 100. As a result, the adjacent cage segments 100 may be displaced relative to each other in the radial direction. If such a displacement of the adjacent cage segments 100 occurs, the outer peripheries of the outer guide portions 114 of the one of the adjacent cage segments 100 come into sliding contact with the outer ring raceway surface while being strongly pressed against the outer ring raceway surface. The inner peripheries of the inner guide portions 115 of the other one of the adjacent cage segments 100 come into sliding contact with the inner ring raceway surface while being strongly pressed against the inner ring raceway surface. Therefore, the outer guide portions 114 and the inner guide portions 115 may wear abnormally. As a result, the cage segments 100 may vibrate in the radial direction or the performance of the rolling bearing may be adversely affected by wear debris.

SUMMARY OF THE INVENTION

One object of the invention is to provide a split cage for a rolling bearing, configured to prevent abnormal wear of cage segments due to relative movement between the adjacent cage segments in the radial direction, and to provide a rolling bearing that uses the split cage.

An aspect of the invention relates to a split cage for a rolling bearing, comprising a plurality of cage segments made of synthetic resin. Each of the cage segments has a pair of rims that face each other while being separated from each other by a predetermined distance, a plurality of cage bars extending from one of the rims to the other one of the rims, and pockets that accommodate rolling elements and each of which is formed of a space defined by the two cage bars adjacent to each other and the rims. The cage segments are arranged in a circular manner in a circumferential direction such that end faces of the rims of one of the adjacent cage segments face corresponding end faces of the rims of the other one of the adjacent segments. The cage segments include: outer guide portions that are formed on outer peripheries of the cage bars so as to project radially outward and that come into sliding contact with an outer ring raceway surface of a rolling bearing so as to guide rotation of the split cage; inner guide portions that are formed on inner peripheries of the cage bars so as to project radially inward and that come into sliding contact with an inner ring raceway surface of the rolling bearing so as to guide rotation of the split cage; and a movement restricting unit that includes protrusions that are formed at one ends of the rims and that protrude in the circumferential direction, and grooves that are formed at the other ends of the rims and that are recessed in the circumferential direction. The protrusions of the one of the adjacent cage segment are fitted in the grooves of the other one of the adjacent cage segments so as to cause the rims of the adjacent cage segments to press against each other to restrict relative movement between the adjacent cage segments in a radial direction.

BRIEF DESCRIPTION OF THE DRAWINGS

The foregoing and further features and advantages of the invention will become apparent from the following descrip

DETAILED DESCRIPTION OF EMBODIMENTS

Figure 1:
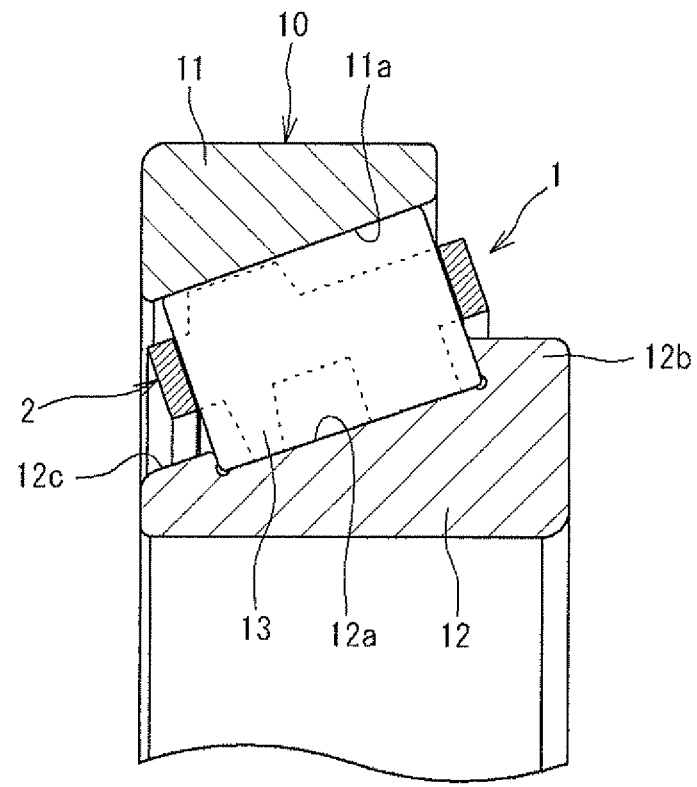
- FIG. 1 is a sectional view showing main portions of a rolling bearing according to an embodiment of the invention.

Hereinafter, embodiments of the invention will be described in detail with reference to the accompanying drawings. FIG. 1 is a sectional view showing main portions of a tapered roller bearing 10 that may function as a rolling bearing according to an embodiment of the invention. The tapered roller bearing 10 is a large-sized tapered roller bearing used to support a main shaft of a wind power generator. In the tapered roller bearing 10, a plurality of tapered rollers 13, which may function as a plurality of rolling elements, is arranged between an outer ring 11 and an inner ring 12. Each of the tapered rollers 13 is held by a split cage 1 that is formed of a plurality of cage segments 2. On the inner periphery of the outer ring 11, an outer ring raceway surface 11a on which each of the tapered rollers 13 rolls is formed. On the outer periphery of the inner ring 12, an inner ring raceway surface 12a on which each of the tapered rollers 13 rolls is formed. At respective end portions of the inner ring 12, a large rib portion 12b and a small rib portion 12c, which are in contact with respective end faces of the tapered rollers 13, are formed with the inner ring raceway surface 12a interposed therebetween.

Figure 2:
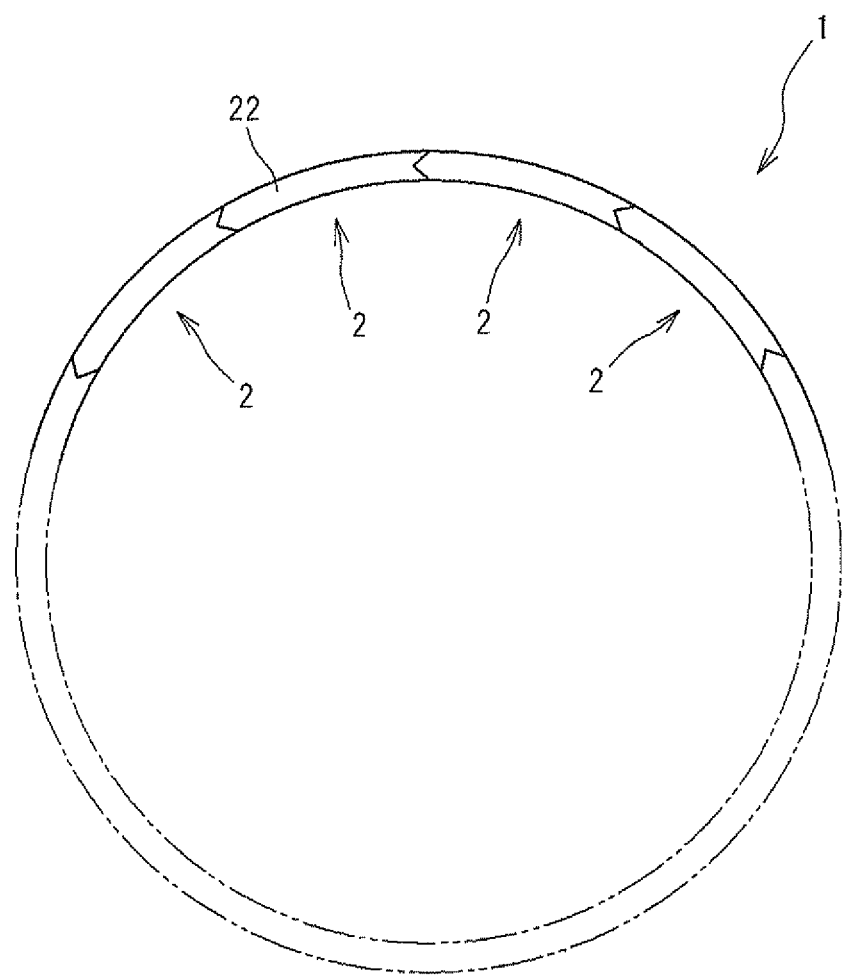
FIG. 2 is a schematic front view showing a split cage for the rolling bearing according to the embodiment of the invention.
Figure 3:
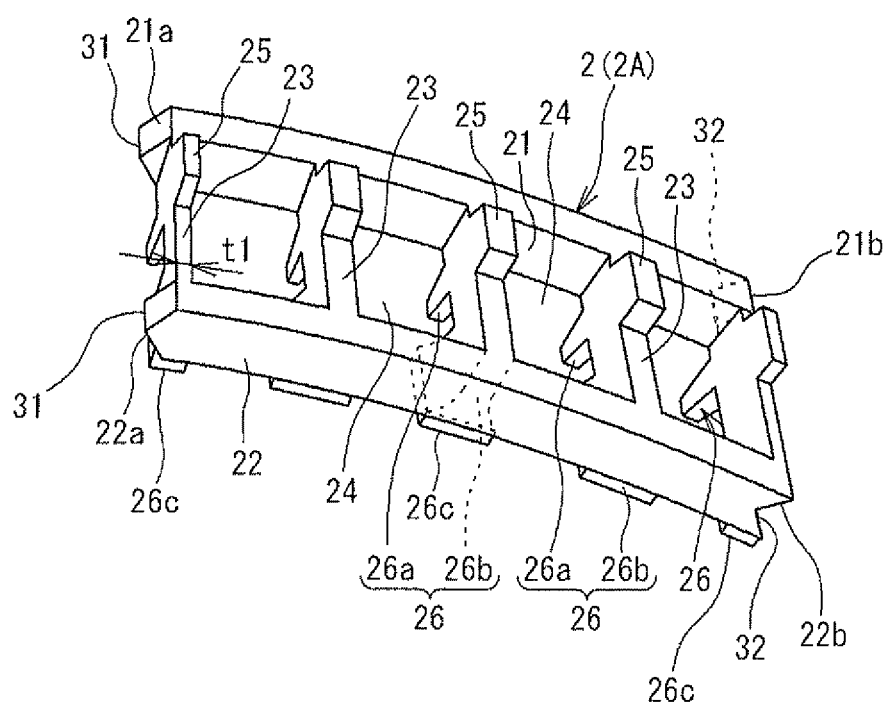
FIG. 3 is a perspective view showing a cage segment.

FIG. 2 is a schematic front view showing the split cage 1. FIG. 3 is a perspective view showing one of the cage segments 2 that constitute the split cage 1. The split cage 1 is formed by arranging the arc-like cage segments 2 in a circular manner along the circumferential direction. The cage segment 2 has a first rim 21, a second rim 22, and a plurality of cage bars 23. The first rim 21 and the second rim 22 face each other while being separated from each other by a predetermined distance. The cage bars 23 extend from the first rim 21 to the second rim 22. In the cage segment 2, pockets 24 that accommodate rolling elements are formed of spaces each of which is defined by the two cage bars 23 adjacent to each other, the first rim 21, and the second rim 22. Each of the cage segments 2 of the split cage 1 is made of a synthetic resin and formed by injection molding.

Figure 5:
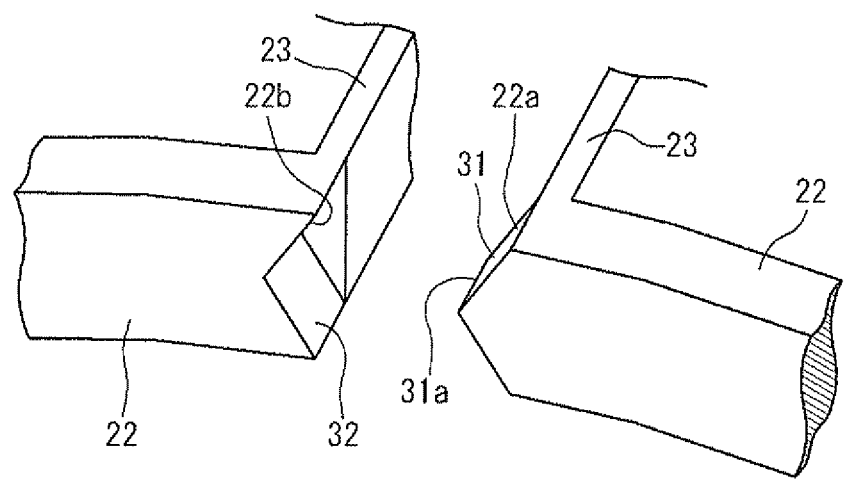
FIG. 5 is a perspective view showing main portions of the adjacent cage segments in a state where the rims of the adjacent cage segments are separated from each other.

Each of the rims 21, 22 extends throughout the entire circumferential length of the cage segment 2. At one ends 21a, 22a of the rims 21, 22, protrusions 31 that protrude in the circumferential direction are formed. Each of the protrusions 31 has a triangular prism shape, and the radial width of the protrusion 31 is gradually reduced from the base end toward the distal end. A ridge line 31a of a vertex of the protrusion 31 extends along the axial direction of the split cage 1 (see FIG. 5). The sectional shape of the protrusion 31 is an isosceles triangle, and the vertex angle of the isosceles triangle is set to, for example, an angle within a range from 90 to 120 degrees. The radial width of the base end of the protrusion 31 is equal to the radial width of each of the rims 21, 22.

At the other ends 21b, 22b of the rims 21, 22, grooves 32 that are recessed in the circumferential direction are formed. Each of the grooves 32 is formed of a cutout having a sectional shape of an isosceles triangle, and a line along the bottom of the groove 32 extends along the axial direction of the cage segment 2. Each of the grooves 32 has a shape that conforms to the protrusion 31 of the adjacent cage segment 2 (see FIG. 4).

On a first rim 21-side portion of the outer periphery of each of the cage bars 23, an outer guide portion 25 that extend radially outward is formed. The outer guide portions 25 are in sliding contact with the outer ring raceway surface 11a of the tapered roller bearing 10 to guide the rotation of the cage segment 2. In addition, on the inner periphery of each of the cage bars 23, an inner guide portion 26 that extends radially inward is formed. The inner guide portions 26 are in sliding contact with the inner ring raceway surface 12a of the tapered roller bearing 10 to guide the rotation of the cage segment 2.

Each of the inner guide portions 26 has a projecting piece 26a located on the first rim 21 side, and a projecting piece 26b located on the second rim 22 side. The axial width of the projecting piece 26b located on the second rim 22 side is larger than the axial width of the projecting piece 26a located on the first rim 21 side. At the distal end (lower end in FIG. 3) of the projecting piece 26b on the second rim 22 side, a lug portion 26c which extends in the circumferential direction is formed. Each side face of the lug portion 26c, which faces the corresponding pocket 24, is a curved face that conforms to the rolling face (outer periphery) of the tapered roller 13, and the tapered roller 13 is held by the lug portions 26c from the radially inner side. In other words, the projecting piece 26b on the second rim 22 side also serves as a holding portion that holds the tapered roller 13. Among the cage bars 23, each of the circumferentially endmost cage bars 23 has a circumferential width t1 that is smaller than the circumferential width of the other the cage bars 23.

Figure 4:
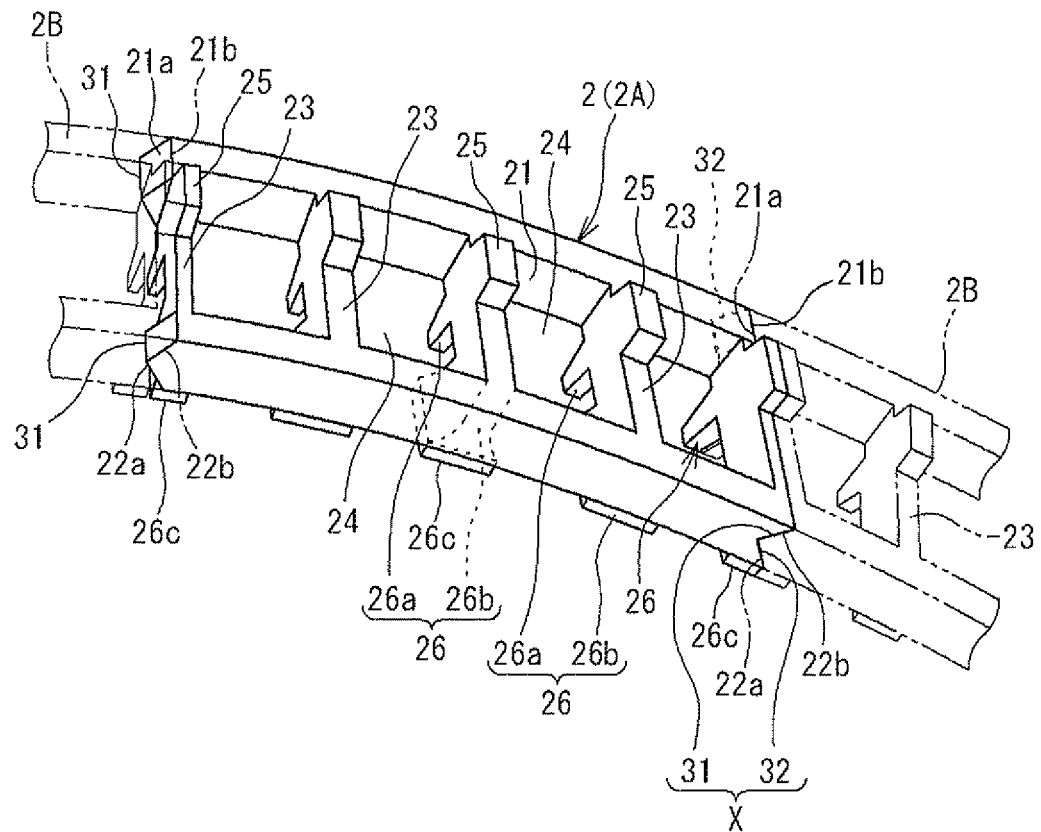
FIG. 4 is a perspective view showing a state where rims of adjacent cage segments are connected to each other.

As shown in FIG. 4, the split cage 1 is formed of the cage segments 2 arranged in a circular manner in a state where the protrusions 31 of one of the adjacent cage segments 2 (hereinafter, referred to as "first cage segment 2A" where appropriate) are fitted in the grooves 32 of the other one of the adjacent cage segments 2 (hereinafter, referred to as "second cage segment 213" where appropriate). In this state, the protrusions 31 and the grooves 32, which are fitted to each other, constitute a movement restricting unit X that restricts relative movement between the first cage segment 2A and the second cage segment 2B in the radial direction.

In the split cage 1 configured as described above, the protrusions 31 of the first cage segment 2A are fitted in the grooves 32 of the second cage segment 2B. Thus, the unity of the cage segments 2 is achieved at a sufficient level. Therefore, even if the first cage segment 2A is pressed in the circumferential direction by the second cage segment 2B that is adjacent to the first cage segment 2A, for example, because the rolling speed of the tapered rollers 13 in the first cage segment 2A falls below that of the tapered rollers 13 in the second cage segment 213, or because thermal expansion of each of the cage segments 2 occurs, that is, even if the end faces of the rims 21, 22 of the first cage segment 2A and the end faces of the rims 21, 22 of the second cage segment 213 that is adjacent to the cage segment 2A press each other, the end faces are prevented from radially sliding each other, and radial displacement of the cage segments 2A, 2B is therefore prevented. Therefore, it is possible to prevent occurrence of the situation where the outer guide portions 25 of the first cage segment 2A come into sliding contact with the outer ring raceway surface 11a while being strongly pressed against the outer ring raceway surface 11a and the inner guide portions 26 of the second cage segment 2B come into sliding contact with the inner ring raceway surface 12a while being strongly pressed against the inner ring raceway surface 12a. Therefore, the outer guide portions 25 and the inner guide portions 26 are prevented from wearing abnormally. As a result, the cage segments 2 are prevented from vibrating in the radial direction, and the performance of the rolling bearing 10 is prevented from being adversely affected by wear debris.

Because the protrusions 31 and the grooves 32 that constitute the movement restricting unit X have a triangular sectional shape, it is possible to reliably fit the protrusions 31 in the grooves 32 just by moving the adjacent cage segments 2 relative to each other in the circumferential direction. Therefore, the work for arranging the cage segments 2 in a circular manner is facilitated. A small clearance may be provided between the adjacent cage segments 2 to make it easier to arrange the cage segments 2 in a circular manner. In this case, a clearance that corresponds to the above-mentioned clearance is formed between the protrusion 31 and the groove 32 that are fitted to each other.

Figure 6:
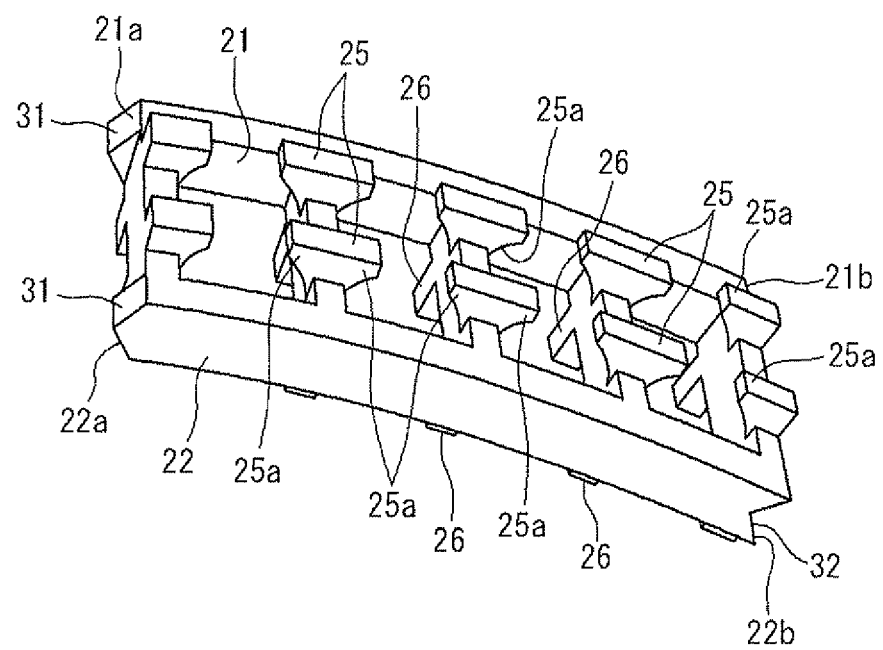
FIG. 6 is a perspective view showing main portions of a split cage according to another embodiment of the invention.

FIG. 6 is a perspective view showing main portions of a split cage 1 according to another embodiment of the invention. In the split cage 1 according to the present embodiment, tapered rollers 13 are held from the radially outer side. In each of the cage segments 2 of the split cage 1, a pair of outer guide portions 25 and a pair of inner guide portions 26, which are projection pieces, are provided on each of the cage bars 23. The outer guide portions 25 in each pair are separated from each other in the axial direction by a predetermined distance. The inner guide portions 26 in each pair are separated from each other in the axial direction by a predetermined distance. At a vertex of each of the outer guide portions 25, a lug portion 25a that holds the tapered roller 13 from the radially outer side is formed so as to project in the circumferential direction. Thus, in the split cage 1 according to the present embodiment, the pair of outer guide portions 25 also serves as a pair of holding portions for holding the tapered roller 13.

In the cage segment 2 according to the present embodiment, the protrusions 31, which are the same as those of the cage segment 2 shown in FIG. 3, are formed at the one ends 21a, 22a of the rim 21, 22, and the grooves 32, which are the same as those of the cage segment 2 shown in FIG. 3, are formed at the other ends 21b, 22b of the rim 21, 22. In the split cage 1 according to the present embodiment as well, the cage segments 2 are arranged in a circular manner in a state where the protrusions 31 are fitted in the grooves 32. Therefore, as in the split cage 1 shown in FIG. 3, it is possible to prevent occurrence of the situation where the outer guide portions 25 of one of the adjacent cage segments 2 are strongly pressed against the outer ring raceway surface 11a and the inner guide portions 26 of the other one of the adjacent cage segments 2 are strongly pressed against the inner ring raceway surface 12a. Therefore, the outer guide portions 25 and the inner guide portions 26 are prevented from wearing abnormally.

Figure 7A:
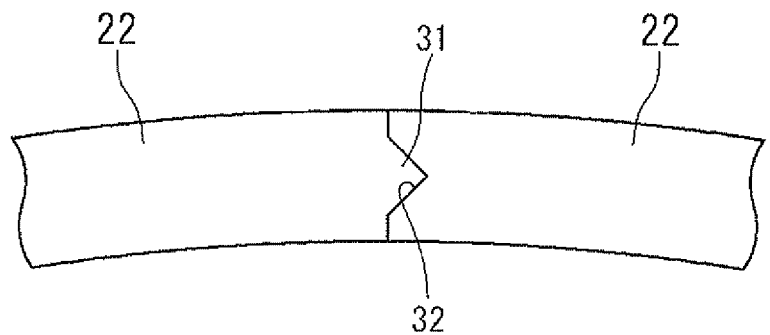
FIG. 7A to FIG. 7C are front views showing main portions of protrusions and groove portions according to other embodiments of the invention.
Figure 7B:
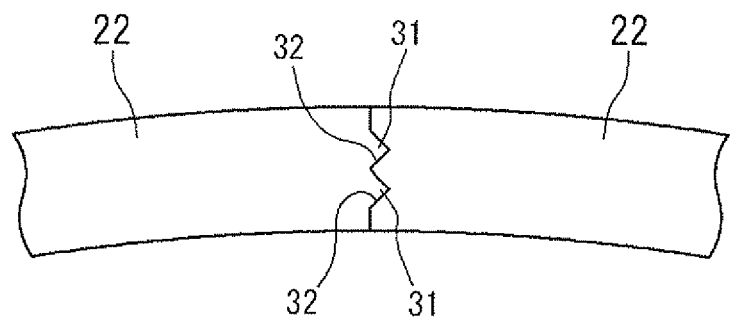
Figure 7C:
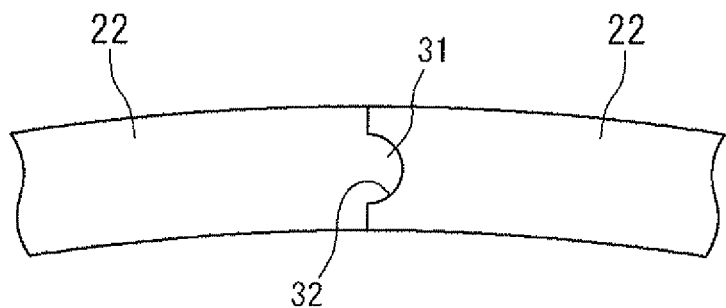
Figure 8:
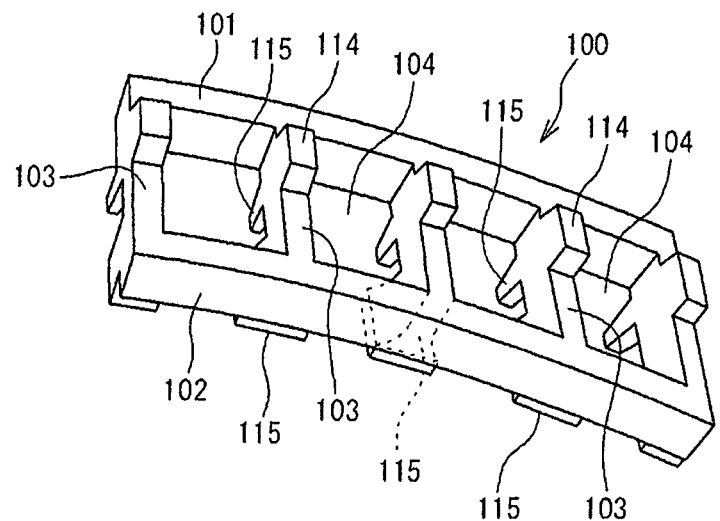
FIG. 8 is a perspective view showing an example of a conventional cage segment.

The split cage 1 according to the invention is not limited to the ones in the foregoing embodiments. For example, the protrusions 31 and the grooves 32 of the cage segments 2 may be formed only at radially center portions of the corresponding end faces of the rims 21, 22 (see FIG. 7A). Alternatively, a plurality of the protrusions 31 and a plurality of the grooves 32 may be formed in the corresponding end faces of the rims 21, 22 (see FIG. 7B). The sectional shape of each of the protrusion 31 and the groove 32 is not limited to a triangle described above, and may be other shapes such as an arc shape and a trapezoidal shape (see FIG. 7C). The protrusions 31 may be formed at the other ends 21b, 22b of the first and second rims 21, 22, and the groove 32 may be formed at the one ends 21a, 22a of the rim 21, 22.

In the above-described embodiments, the protrusions 31 and the grooves 32 that constitute the movement restricting unit X are formed only at the first and second rims 21, 22. However, a protrusion may be formed at the endmost cage bar 23 of the cage segment 2, which is on the one side in the circumferential direction, and a groove may be formed at the endmost cage bar 23 in the other side in the circumferential direction, in addition to the protrusions 31 and the grooves 32 of the first and second rims 21, 22. In this case, by fitting the protrusion of the cage bar 23 of the one of the adjacent cage segments 2 into the groove of the cage bar 23 of the other one of the adjacent cage segments 2, relative movement between the adjacent cage segments 2 in the radial direction is restricted more reliably, and the unity of the adjacent cage segments 2 is achieved at a sufficient level. Therefore, even if the circumferential thickness of each of the endmost cage bars 23 is smaller than that of the intermediate cage bars 23, sufficient stiffness of the endmost cage bars 23 is ensured. The circumferential thickness of each of the endmost cage bars 23 may be equal to that of the intermediate cage bars 23, and the protrusion and the groove may be formed at the corresponding endmost cage bars 23.

In the split cage for a rolling bearing and a rolling bearing that uses the split cage according to the invention, even when the rims of the adjacent cage segments are pressed against each other, relative displacement between the adjacent segments in the radial direction is prevented. Therefore, the outer guide portions and the inner guide portions are prevented from being in sliding contact with the corresponding raceway surfaces while being strongly pressed against the corresponding raceway surfaces. As a result, it is possible to prevent abnormal wear of the cage segments due to relative movement between the adjacent cage segments in the radial direction.

What is claimed is:
1. A split cage for a rolling bearing, comprising,
a plurality of cage segments made of synthetic resin, each of the cage segments having a pair of rims that face each other while being separated from each other by a predetermined distance, a plurality of cage bars extending from one of the rims to the other one of the rims, and pockets that accommodate rolling elements and each of which is formed of a space defined by the two cage bars adjacent to each other and the rims,
wherein:
the cage segments are arranged in a circular manner in a circumferential direction such that end faces of the rims of one of the adjacent cage segments face corresponding end faces of the rims of the other one of the adjacent segments, and
the cage segments include:
outer guide portions that are formed on outer peripheries of the cage bars so as to project radially outward and that come into sliding contact with an outer ring raceway surface of a rolling bearing so as to guide rotation of the split cage;
inner guide portions that are formed on inner peripheries of the cage bars so as to project radially inward and that come into sliding contact with an inner ring raceway surface of the rolling bearing so as to guide rotation of the split cage; and a radial movement restricting unit that includes protrusions that are formed at one ends of the rims and that protrude in the circumferential direction, and grooves that are formed at the other ends of the rims and that are recessed in the circumferential direction, the protrusions of the one of the adjacent cage segment being fitted in the grooves of the other one of the adjacent cage segments, the protrusions having a triangular prism shape, in which a ridge line of a vertex of the protrusion extends in an axial direction of the split cage, the groove is a cutout having a triangular sectional shape that conforms to the protrusion, and the vertex of the protrusion being disposed along a same lane as one of the plurality of cage bars.

2. A rolling bearing, comprising, rolling elements arranged between an outer ring raceway surface and an inner ring raceway surface and held by a cage, wherein the cage is the split cage according to claim 1.

3. A rolling bearing, comprising, rolling elements arranged between an outer ring raceway surface and an inner ring raceway surface and held by a cage, wherein the cage is the split cage according to claim 1.

* * * * *